United States Patent

[11] 3,614,445

| [72] | Inventors | Paul Platzek<br>Delft;<br>Gerardus van Kempen, Delft; Dominicus Ros, The Hague, all of Netherlands |
| --- | --- | --- |
| [21] | Appl. No. | 858,200 |
| [22] | Filed | Sept. 15, 1969 |
| [45] | Patented | Oct. 19, 1971 |
| [73] | Assignee | Nederlandse Organisatie Voor Toegepast-Natuurweten-Schappelijk Onderzoek Ten Behoeve van Nijverheid Handel en Verkeer, Netherlands |
| [32] | Priority | June 3, 1966 |
| [33] | | Netherlands |
| [31] | | 6607795 |
| | | Continuation of application Ser. No. 643,099, June 2, 1967, now abandoned. |

[54] MEASURING WIDTH VARIATIONS OF A MOVING SHEET BY THE USE OF BETA-RAYS
5 Claims, 6 Drawing Figs.

[52] U.S. Cl. .................................................. 250/83.6, 250/83.3

[51] Int. Cl. .................................................. G01t 1/18
[50] Field of Search .................................. 250/83.3 D, 83.6, 43.5 D, 219 WD

[56] References Cited
UNITED STATES PATENTS

| 2,097,760 | 11/1937 | Failla ........................... | 250/83.3 D |
| 2,465,821 | 3/1949 | Smoluchowski ............. | 313/93 |
| 2,941,087 | 6/1960 | Blumberg et al. ........... | 250/219 WD |
| 3,001,074 | 9/1961 | Reider ......................... | 250/83.3 D |
| 3,278,747 | 10/1966 | Ohmart ....................... | 250/83.3 D |

*Primary Examiner*—Archie R. Borchelt
*Attorney*—Hammond & Littell

ABSTRACT: A device is described for measuring the variation in width of a moving sheet of material comprising two substantially identical sources of $\beta$ rays positioned above the edges of the sheet and preferably one elongated ionization chamber positioned below the sheet. An electrical scheme is shown which comprises a differential amplifier.

INVENTORS
Paul Platzek
Gerardus Adrianus Van Kempen
BY Dominicus Ros

Hammond and Littell

ATTORNEYS

MEASURING WIDTH VARIATIONS OF A MOVING SHEET BY THE USE OF BETA-RAYS

PRIOR APPLICATION

This application is a continuation of our copending application Ser. No. 643,099, filed June 2, 1967, now abandoned.

The present invention relates to a device for the contactless controlling of the width of an object by means of radiation, in particular the width of a moving sheet of entirely or partly transparent material such as, for instance, paper, fabric or synthetic foil.

Devices of this type are known per se, especially those for nontransparent materials; the object to be measured is, for instance, irradiated directly or via a rotating or vibrating mirror by a light source, and the reflected radiation is measured by a photocell, or each of the two edges of the object to be controlled is situated between a light source and one or more photocells and the radiation which is not intercepted by the object is measured.

However, when using these optical methods, problems will arise in connection with the screening of the detectors against environmental light. In addition to this, a measuring principle based on reflection is rather sensitive to slight changes in the structure of the edge and of the surface of the sheet in the measuring area, while when applying the absorption principle on partly transparent objects, the measuring result is influenced by variations in the thickness of the material.

A further difficulty of a general nature strongly asserts itself whenever width control is carried out. The object to be controlled, usually a fast-moving sheet, may, during production, move to and fro laterally on the guiding device, independently of changes of width, if any. The result hereof is that one of two things: either the measuring devices placed at the edges of the object, no matter on what principle they work, must be able to move in such a manner that the influence of the variations in position is eliminated; or the measuring devices should be made so large and so homogeneous at the same time that, when the width is constant, even the largest possible variations in position will only have a negligible influence on the measuring signal. When using the known method, in which either edge of the material runs between a light source and one or more photocells, the last-mentioned possibility means, for instance, that the light sources should radiate a constant intensity at least in one dimension of their surfaces over several centimeters and that the sensitivity of the photocells or of the assemblies of photocells should also be constant in one dimension of their surfaces over several centimeters. If the material to be controlled can move, for instance, two centimeters to the left and also two centimeters to the right relative to an average position, it should be required with a view to a width increase to be established that the measuring devices should be homogeneous over 5–6 cm.

It is an object of the invention to provide a device for the contactless width control of objects, usually fast-moving sheets, the said device being substantially insensitive to environmental influence and to changes of thickness and surface structure of the pertinent object and being able, without any mechanical scanning device, to indicate changes of width in the order of magnitude of one millimeter notwithstanding variations in position of the object.

An important feature of the invention is that each of the two edges of the object to be controlled is situated between a source of ionizing radiation and a detecting device in such a way that the sum of the radiation which is not absorbed by the object can be recorded.

Ionizing radiation of relatively slight penetrating power, such as the beta rays of carbon-14, promethium-147, krypton-85, yttrium-90 and others, have the advantage that a strong "shadow" effect can be obtained, even in the case of a thin, transparent material such as foils of transparent synthetic rasin. This shadow effect may be increased by an appropriate choice and construction both of the radiation sources and of the detecting device. The detecting device can at choice comprise two detectors connected in parallel, or one single long detector. The latter may, if desired, be constructed so as to be flexible and/or to have a variable effective length. The detecting device should in any case satisfy the condition that the sum of the radiation received determines the signal which is passed on to a measuring instrument.

If the object remains in a fixed position with respect to the combination radiation source-detecting device all the time, it is possible, in accordance with the purpose of the control, to choose different geometrical arrangements of the system radiation source object detector. If, however, the object will carry out variations in position as described above, it is necessary that the radiation sources and the detecting device should at least extend as far outward as inward on either side of the object as is made necessary by the largest variation in position. It is, therefore, an aspect of the present invention that both radiation sources and the detecting device are dimensioned in such a way that, even at the largest possible variation of position of the object and at the largest possible change of width occurring at the same time, direct radiation can hit the detecting device at both edges of the object, while, also at both edges, part of the detecting device is always screened off by the object. If, in connection with the use of soft beta rays, the detectors or the detector are provided with thin windows, these windows are also positioned in such a way that, even at the largest possible variation of position of the object and at the largest possible change of width occurring at the same time, direct radiation can hit the windows or the single window—as the case may be—at both edges of the object, while, also part of the windows or of the single window should always be screened off by the object.

A further aspect of the invention relates to the shape of the radiation sources and of the detecting device, which shape is chosen in such a way that the detector signal, produced by two detectors connected in parallel or by one single detector, is insensitive to any lateral displacement of the object to be controlled. If at either edge of the object a radiation source and a detector are placed, it is necessary that the two radiation sources should be equivalent to each other and that the two detectors should also be equivalent to each other. An important condition for equivalence is equality of shape and dimensions. If one single long detector in combination with two radiation sources is used, it is necessary that the two radiation sources should be identical in shape and that the detector parts positioned opposite the radiation sources, should also be identical in shape. The just-formulated identity in shape of the two detectors or of the extremities of a single long detector, is particularly important in the case of soft beta rays being chosen as ionizing radiation, the detecting device, therefore, being equipped with one or two windows. The real shape of the detectors, of the detector extremities, of the windows and the window extremities is of minor importance, provided the above-described identity in shape is guaranteed. In the embodiments of the invention to be mentioned hereinafter, in which the detectors or detector respectively are provided with windows, the sources and the detector windows are partly of rectangular and partly of square design. However, it is also possible to apply source and window surfaces of circular, diamond-shaped or different design, the accuracy of the indication being determined by the shape of the sources and of the detectors in a manner to be calculated in advance.

A further important aspect of the invention is that on the one hand the radiation sources are homogeneous and equivalent, and that on the other hand those parts of the walls of the detecting device which have to transmit the radiation, are made of one and the same homogeneous material. A radiation source is homogeneous, if each macroscopic surface element of the source, for instance each lineal millimeter, contributes the same share towards the activity of the source, activity being understood to mean the total number of ionizing particles or photons averagely radiated by the source per unit of time. An elongated radiation source, constructed, for instance, in the form of a narrow strip or tube, is also homogeneous in the sense of the invention, if every lineal millimeter of the source supplies the same contribution towards the activity of the source. Two radiation sources are equivalent, if they contain the same radionuclide and possess the same activity. A wall or window material is homogeneous in the sense of the invention, if its thickness measured in units of weight per unit of surface is constant and if it is free from holes and pores.

If the two last-mentioned aspects of the invention, i.e. the equivalence and the homogeneity of the radiation source on the one hand and the equivalence and the homogeneity of the detectors and/or the windows on the other hand, have not or only partly been satisfied, changes of width of the object to be controlled, will, it is true, cause signal changes, but simultaneous changes in the position of the object may partly be responsible for the signal variation.

The invention will be further elucidated hereinafter with reference to the accompanying drawing, showing diagrammatical views of a few embodiments of the invention by way of example. In this drawing.

Figure 3:
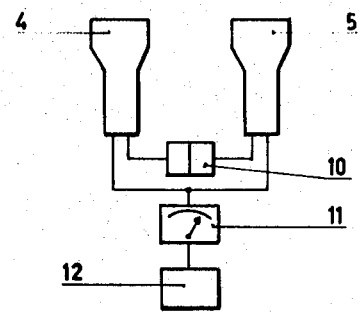
Figure 4:
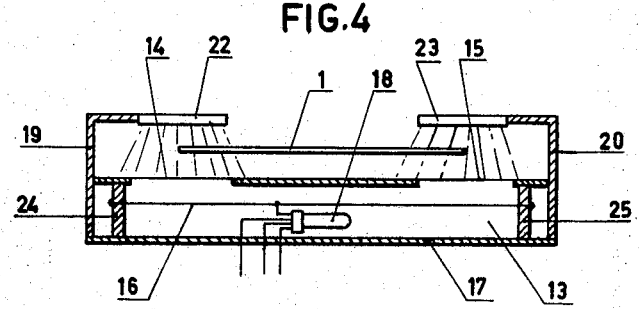
Figure 5:
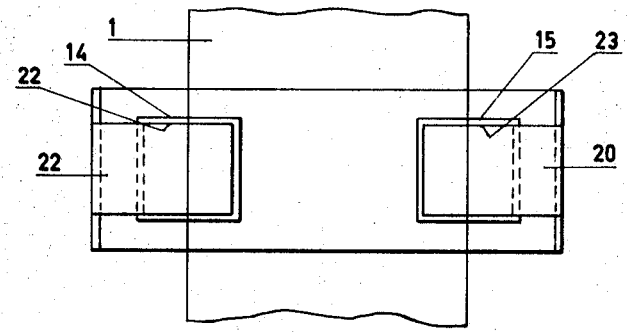
Figure 6:
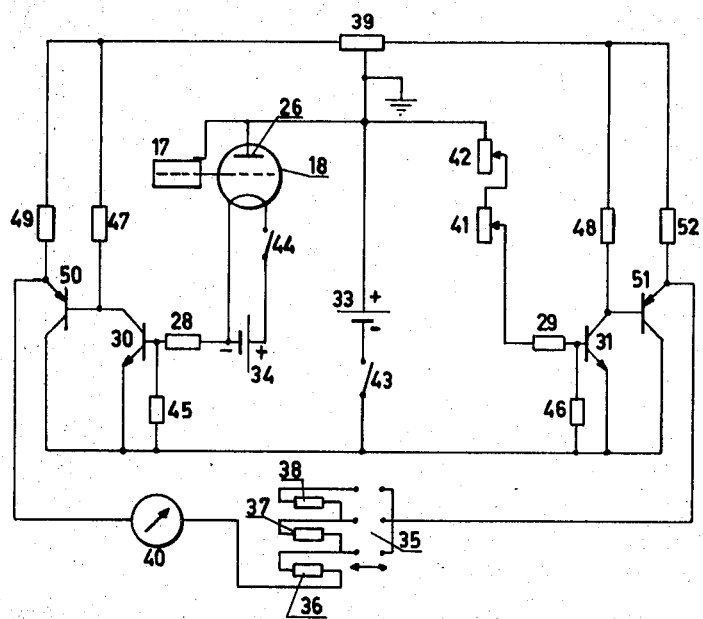

FIG. 3 gives a block diagram of the whole measuring arrangement;

FIG. 4 is a side view of an arrangement, in which a single, elongated ionization chamber with two windows is used;

FIG. 5 a top view of the arrangement represented in FIG. 4;

FIG. 6 a diagram for an electric circuit for the arrangement according to FIGS. 4, 5.

Figure 1:
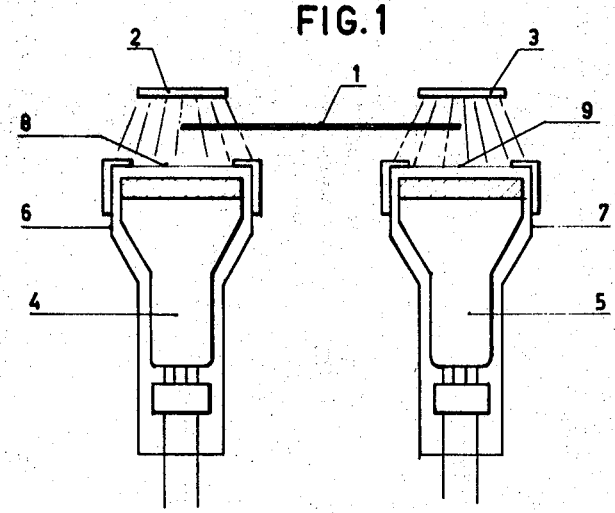
FIG. 1 is a side view of an arrangement, in which two conventional scintillation detectors are used.
Figure 2:
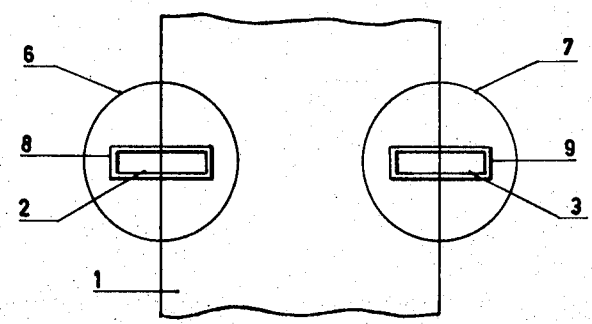
FIG. 2 is a top view of the arrangement shown in FIG. 1.

In the FIGS. 1 and 2, the sheet to be controlled is indicated by 1, 2 and 3 designating two sources of ionizing radiation. Here the radiation detectors consist of conventional scintillation detectors 4 and 5, which are mounted in the metal holders 6 and 7, provided with windows 8 and 9, transmitting ionizing radiation, the surface of said windows being somewhat larger than the surface of the radiation sources 2 and 3.

In the measuring arrangement represented in FIG. 3, the reference numerals 4 and 5 designate the two scintillation detectors connected in parallel, 10 is a double high-tension supply, 11 is an indicator instrument and 12 is a compensator.

In the FIGS. 4 and 5, the sheet to be controlled is again represented by 1, and 22 and 23 indicate the equivalent sources of ionizing radiation, which are secured to the ionization chamber with holders 19 and 20 respectively. Here the detecting device used is a single, elongated ionization chamber 13, which near its extremities and opposite the radiation sources is provided with windows 14 and 15, transmitting ionizing radiation, the surface of the said windows again being somewhat larger than the surface of the radiation sources 22 and 23.

In the ionization chamber 13, 16 is the central electrode, which consists of a metal wire extended between two pieces 24 and 25 of high-grade insulating material fixed in the chamber. The wall 17 is used as counter electrode. In the ionization chamber there is provided an electrometer tube 18, the grid 21 of which is directly connected to the central electrode 16, and shows a "floating" potential.

The tube can be connected in a known way with an amplifier circuit having a compensation control.

For this purpose it is preferred to use the circuit represented in FIG. 6.

In FIG. 6, the differential amplifier 32 has two input resistors 28 and 29 respectively, which are connected to the two input transistors 30 and 31 respectively. A double two-stage amplifier is represented, connected to a measuring device 40, which can be adjusted to various sensitivities by means of a multistep switch 35 and resistors such as 36, 37 and 38. The anode 26 of electrometer tube 18 is connected to the counter electrode 17 of the ionization chamber and with the positive side of battery 33 and is preferably also connected with earth.

This battery serves as a supply for the anode voltage of the tube 18 as well as for the transistor amplifier. Herefor an ordinary dry cell of about 7 volts may be used.

The filament current of the electrometer tube is supplied by battery 34. The negative side of the filament is also connected to the input resistor 28.

On the other side of the differential amplifier two variable resistors 41 and 42, the second input resistor 29 and the resistor 46 form a variable voltage divider. Herewith it is possible to adjust the bridge consisting of the electrometer tube 18 and the resistors 28, 45, 46, 29, 41 and 42. Resistors 47, 49 and 48, 52 are provided for the supply of the required volume to transistors 30 and 50 on one side and 31 and 51 on the other side of the differential transistor.

On the positive side of the differential amplifier, a potentiometer 39 is provided for adjusting the zero point of the differential amplifier.

Further, switches 43 and 44 are provided for connecting and disconnecting the voltage supplies.

In a convenient embodiment of said scheme of FIG. 6 we used the following parts.

18 electrometer tube CK 5886 (Raytheon)
28 1 KΩ
29 1 KΩ
30 and 31 transistor BFY 30 (Intermetall)
50 and 51 transistor BC 212 (Intermetall)
36, 37 and 38 resistances depending on the particular meter 40 used
39 potentiometer 500 Ω.
41 potentiometer 50 KΩ.
42 potentiometer 5 KΩ.
45 and 46 15 Ω.
47 and 48 330 Ω.
49 and 52 390 Ω.

We observe that there are now on the market various field-effect transistors which can replace the electrometer tube; likewise the differential amplifier may be replaced by each of several of the integrated circuits of this type now on the market.

We claim:

1. A device for contactless measuring of width variations of a moving at least partially transparent sheet comprising two substantially identical sources of ionization radiation positioned above the edges of a moving sheet of material, means for detecting ionization radiation positioned below the moving sheet and means for measuring the total amount of radiation not absorbed by the moving sheet of material, said sources of ionization radiation and said means for detecting ionization radiation being positioned with respect to the moving sheet in such a manner that the radiation emanating from said sources hits said means for detecting ionization radiation at both edges of the moving sheet even at the largest possible variation of position, and a part of said means for detecting ionization radiation is always screened by the moving sheet during the measurement, said ionization radiation being weak beta rays from a member of the group consisting of carbon-14, promethium-147, krypton-85 and yttrium-90.

2. A device of claim 1 wherein a single, elongated ionization chamber is used as the detecting device.

3. A device of claim 1 wherein the ionization chamber is provided with two substantially equally shaped and equivalent windows for transmission of the ionizing radiation passing the edges of the moving sheet.

4. A device of claim 1 wherein two detectors connected in parallel are the detecting means, each detector having homogenous and equally shaped windows.

5. A device of claim 1 wherein the beta rays are from carbon-14.